United States Patent [19]

Wood

[11] 4,159,490

[45] Jun. 26, 1979

[54] APPARATUS FOR AUTOMATICALLY SYNCHRONIZING THE OPERATION OF A DEVICE, FOR PRESENTING AUDIO INFORMATION TO OCCUPANTS OF A VEHICLE, TO CORRESPOND WITH ITS MOVEMENT ALONG A PREDETERMINED ROUTE

[76] Inventor: Donald R. Wood, P.O. Box 2772, Taos, N. Mex. 87571

[21] Appl. No.: 850,411

[22] Filed: Nov. 10, 1977

[51] Int. Cl.² .............................................. G11B 5/00
[52] U.S. Cl. ..................................................... 360/12
[58] Field of Search .................... 179/100.1 C; 360/12, 360/23, 6; 346/8; 340/23

[56] References Cited

U.S. PATENT DOCUMENTS

| 2,928,186 | 3/1960 | Hirsh | 179/100.1 C |
|---|---|---|---|
| 2,965,720 | 12/1960 | Bumstead et al. | 360/12 |
| 3,575,575 | 4/1971 | Kean | 360/12 |
| 3,596,010 | 7/1971 | Patterson | 360/12 |
| 3,711,653 | 1/1973 | Barbier | 340/23 |
| 3,755,818 | 8/1973 | Greenspan | 360/12 |
| 3,845,289 | 10/1974 | French | 340/24 |
| 3,938,092 | 2/1976 | Callahan | 360/12 |
| 4,030,127 | 6/1977 | Newman | 360/12 |

Primary Examiner—Vincent P. Canney
Attorney, Agent, or Firm—Walter R. Keller

[57] ABSTRACT

This invention discloses a system whereby a recorded magnetic tape is played on a tape recorder presenting information in audio format to the driver and passengers of vehicles. The tape recorder may be automatically controlled so that particular descriptive, informative, or instructional passages are played at appropriate locations along a determined route. The recording is correlated to distance traveled by a device which senses the operation of the cable which drives the vehicle odometer, and by corrective information regarding tire diameter and cable to wheel rotation ratio. The correlation is correctable to correspond to an external reference system, specifically mileage markers along interstate or other highways which have standard mileage markers, thus insuring a high degree of continuous synchronization between the location of the vehicle and the particular passage played.

7 Claims, 6 Drawing Figures

APPARATUS FOR AUTOMATICALLY SYNCHRONIZING THE OPERATION OF A DEVICE, FOR PRESENTING AUDIO INFORMATION TO OCCUPANTS OF A VEHICLE, TO CORRESPOND WITH ITS MOVEMENT ALONG A PREDETERMINED ROUTE

BACKGROUND

This invention relates to tape recorders and more particularly it concerns a system for automatically controlling and synchronizing the operation of a tape recorder to correctably correspond to the movement along a determined route of the vehicle in which the invention is mounted.

In the past, the system have relied only on the odometer of the vehicle to provide the information on the location of a vehicle. Typical of these systems are BARBIER, U.S. Pat. No. 3,711,653 and KEAN, U.S. Pat. No. 3,575,575. The difficulties with these past system are numerous, but four major difficulties encountered are: the lack of ability to account for deviations by the vehicle operator from the planned and pre-recorded routes; the inherent inaccuracies of the standard odometers; the complete lack of correlation with an external reference system; and the lack of uniformity and the consequent appearance of randomness inhibiting the use of the system from becoming a learned capability of the user. The errors caused by deviation from the planned route, and the inherent inaccuracies in odometers are cumulative and the longer the deviation, or the trip, the greater the errors between particular passages on the tape recording and the vehicle location become.

It is an object therefore to provide a system whereby correlation of the sequence and position of the tapes, with the location of the vehicle, is easily and accurately achieved by correlation with an external reference system.

In addition, prior systems usually provided tapes which were usable in only one direction, uni-directional. Consequently, the distributor of the tapes could only sell them, or face the redistribution problem of returning a specific tape to its original distribution point. It is therefore a objective of this invention to provide bi-directional tapes, usuable and correlatable in either direction over a determined route, of uniform distance, so that cooperating distributors can shuttle the tape back and forth between them, economically, and the use of the invention can be a learned capability of the user.

Further, in the past, no attempts have been made to establish a means for correlating tapes between intersecting, dividing, or merging routes. Combined with the previously discussed draw back of uni-directional systems, the lack of route correlation makes the number of tapes required by prior systems to adequately present the desired information over a whole network of routes in one area, state, or country, approach astronomical proportions. It is therefore an objective of this invention to provide for bi-directional tapes and correlation of the tapes and tape sections to specific route segments, especially on U.S. Interstate Routes, and thereby provided substantial coverage over a network of routes over the entire United States or any other specific area, with a finite number of easily managed tapes.

SUMMARY

According to the broader aspects of the present invention, means are provided for turning on the system, installing a recorded tape, which is specifically designed for a particular route, and then continuously correlating the tape position with the external reference system, such as the mileage markers on interstate freeways. Means are provided for adapting the vehicle odometer drive mechanism to provide a signal corresponding to distance traveled, with an adjusting means modifying the distance signal for variations in the tire dimensions and odometer-wheel rotation ratio. Additionally, a means is provided to correlate the physical location of the vehicle as observed from the external reference with the playing of a particular passage of the tape.

As applied to a tape recorder used on a specific route segment of interstate highway, each tape will contain a travelog describing local geography, history, color and folklore, zoological and botanical information, limited advertisement, and availability of facilities such as gas stations, restaurants, and motels over a uniform but arbitrary distance of fifty miles. As speed variations in a travelling vehicle are ordinarily to be expected because of traffic control signs or warnings, and because each driver drives at different average speed, the tape which is to be played on a constant speed tape-player, must accommodate and adjust for speed variations in the vehicle. Basically, this is accomplished by providing sufficient and frequent pauses in the tape, which without disturbing or annoying the listener can be automatically eliminated or lengthened by either passing the pause, or temporarily and automatically stopping the tape player for a controlled period of time thereby expanding the pause. In addition, the variations in the odometer-wheel rotation ratio, and tire size, especially varying in different vehicles such a small cars and large trucks, require a method of adjustment for such variations in order to provide a universally useable system. This is accomplished by means of setting on dials which electronically modify or control the odometer signal. The proper settings for any vehicles and any tires are available from the vehicle and tire manufactures. In addition, the system provides a clock pulse generator which gives time signals, approximately every millisecond of operation to the system. The time pulse signals, which are a measure of length of time of playing the tape, are compared with the odometer signal, and preset constants, to determine whether the vehicle is ahead of the tape or behind the tape. If the vehicle is ahead of the tape the pauses are eliminated. If the vehicle is behind the tape, the next pause is held until the vehicle catches up. In spite of all the accuracy devices, built into the system, all errors cannot be automatically corrected or eliminated, and a driver may decide to deviate from the planned route or back track for a while, or just sight-see around a town. All these will generate error on resuming the route. To initially, or enroute, correct these errors the operator of the system can set in a current proper mileage as shown by the external reference, such as highway mileage marker, press a set mileage button, and the system will automatically adjust to this proper mileage mark. Mileage markers are now required on all interstate highways, and other federally funded highways, and provide accuracy to one-tenth of a mile, the error being non-cumulative. Finally, the system has two other modes of operation, the semi-automatic and the manual. The amount of geographical, zoological, botanical, historical or other interest information at anyone location will vary from any other. Consequently along one route it may be very desireable to have a long continuous spoken description recorded without substantial pauses, or alternatively, it may be desirable to insert special information such as travel instructions or a lengthy travelog about a particular point of interest. To accomodate a variety of spoken segments with appropriate pauses, mileage index signals, and electronically detectable instructions on the tape it will be required to instruct the automatic tape player-controller where, when and how to control the tape. This is accomplished by installing a second reading head in the tape player to read non-audible signals on the tape. These signals are converted to electrical signals, instructing the tape player controller whether to play continuously, disregard speed and odometer signals, or mileage marker settings placed by the operator, and when and where to resume automatic operation.

In some areas of the country, the travelog can be conveniently segmented on the tape with standard pauses. In fact, this can be done in all areas by the mere omission of some materials. With uniform segmentation of the tape and pauses, the need for a second head to read instructions to the controller can be eliminated thus considerably economizing the system. The only significant limitation is the requirement that the segmentation on the tape of spoken words and pauses must be standard. To operate the system with standard segmentation and pauses, the system is placed in the semi-automatic mode, which deactivates the second reader head. This is a desireable mode in the event a special interest tape is desired to be played along the route.

All the automatic features will not account for the variety of whims and vagaries of the travelling public. To adjust to passenger interest changes, such as a desire to listen to the radio for a while, then to hear the travelog only on certain interest location, then to talk to each other; a manual mode must be provided. In the manual mode the traveler is given the usual tape cassette which also has a viewing window so that visible mileage marks on the tape can be seen. When the traveler reaches the mileage mark corresponding to the one he wants to hear, he plugs in the cassette which he has pre-set to the desired mileage mark. Major interest points with corresponding mileage marks will be cataloged on the cassette. In the manual mode the traveler has total control, and must make all adjustments to speed and distance. The controller in this mode operates in all respects just as a standard tape-player, equipped with a fast-forward or reverse tape positioning control; yet the traveler with the mileage marker index on the cartridge can reasonably accurately position the tape.

Most efficient utilization of this system is when its total operation has become a learned capability and the user can take operative steps without considerable study. To facilitate the use of the system becoming a learned capability, each tape will correspond to a uniform distance, arbitrarily chosen to be fifty miles.

BRIEF DESCRIPTION OF THE DRAWINGS

FIG. 6 is a functional diagram of the processor.

DESCRIPTION OF THE PREFERRED EMBODIMENT

The system of this invention comprises a player-controller 1, a reader 2, a tape cassette 3 and tape 4, all intended to be mounted in a vehicle which has a power source; and a means for approximately determining distance the vehicle has traveled from a determined starting point, such as an odometer 5, all used in conjunction with an external reference source.

Figure 1:
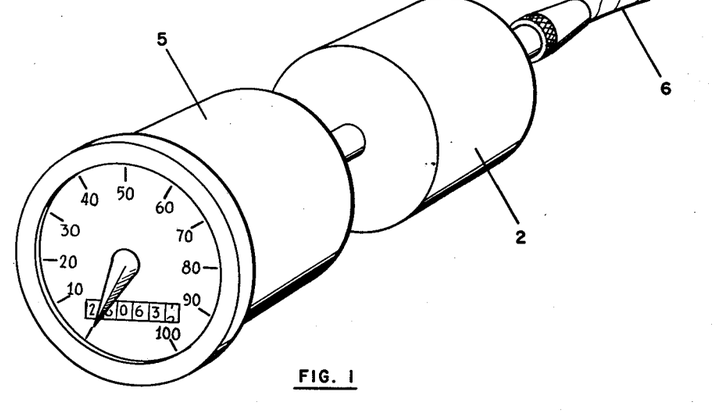
FIG. 1 is an isometric view of the read, odometer, and cable.
Figure 2:
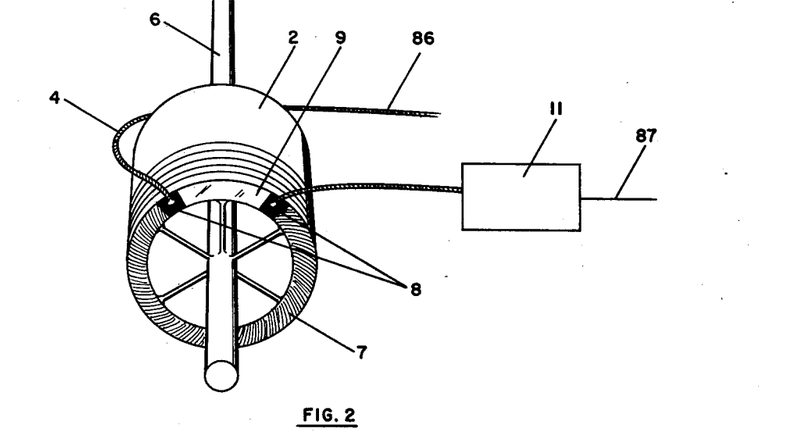
FIG. 2 is an isometric view of the reader without its housing.

Referring to FIG. 1, the reader 2 is shown connected to an odometer drive cable 6 on one end and to the odometer 5 on the other end. Because of federal regulations which discourages opening or tampering with the odometer 5 itself, and for simplicity of installation the reader 2 is built as a separate item which has no effect on the function or accuracy of the odometer 5 or speedometer. FIG. 2 shows the internal parts of the reader 2. As shown, the odometer drive cable 6 turns a wafer ring 7, which is of electrically conducting material such as copper, except for a section 9 of the wafer ring 7 made of non-conducting material. Electrical current is supplied from the player controller 1 through line 86 to two wipers 8 which contact the wafer ring 7. When, either or both wipers 8 are in contact with the non-conducting section 9 of of the wafer ring 7 no electrical current flows. When both wipers 8 are contacting the conducting section of the wafer ring 7, electrical current does flow, to a flip-flop switch 11 which is set by current and reset by a lack of current, and the flip-flop switch 11 then triggers a pulse indicating one revolution of the odometer drive cable 6 which is sent back to the player-controller 11 thru line 87. It is realized that there are many standard revolution counters to generate a pulse for each revolution which use different principles such as power loss, current interruption, and voltage generation with magnets, and the use of any standard revolution counter which provides a revolution electrical signals is within the contemplation of this invention.

Figure 3:
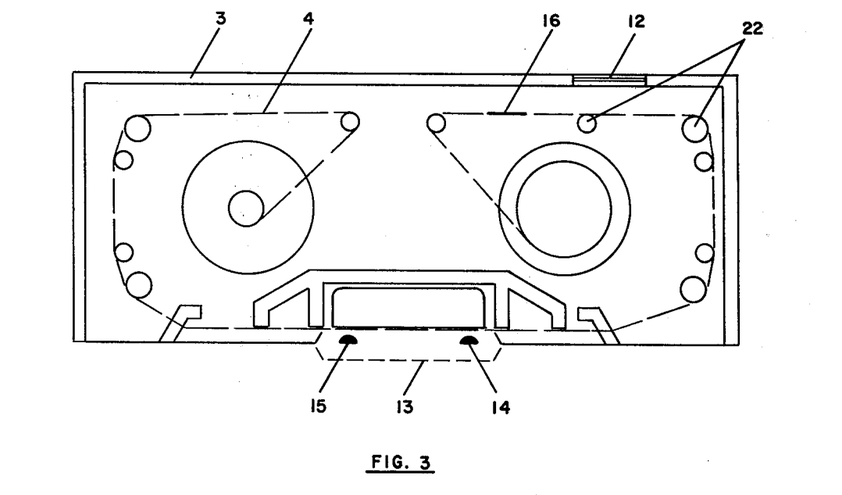
FIG. 3 is a plan view of the cassette with tape.

FIG. 3 shows a plan view of the cassette 3 with tape 4 installed. The cassette 3 has a viewing window 12, and space 13 for a control read head 14 and an audio read head 15 to contact the tape 4, and two guide rollers 22 to guide the tape 4 past the viewing window 12. Prior recorded, control signals in a plurality of binary coded digital data on the tape 4 are read by a control read head 14 in the player-controller 1, which automatically de-energized the audio read head 15 so that the control signals do not cause annoying noises to be transmitted to the listeners. The control signals are then read, converted to electrical signals supplied to the player-controller 1.

The viewing window 12, which may be of any transparent material, permits the system operator to view marking 16 on the tape 4.

Figure 4:
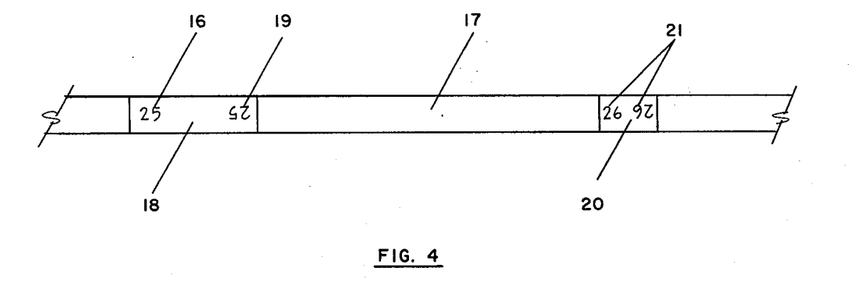
FIG. 4 is a plan view of a segment of tape.

FIG. 4 shows a segment of tape 4. The standard tape 4 for cassettes is commercial available in sixty minutes, and forty-five minute playing time per side, and it is envisioned that standard tapes for cassettes are to be used for economical reasons. The preferred embodiment herein describes a sixty minute cassette tape 4. It is realized that the invention applies equally as well to cartridge type recorders and spool recorders and these would fall within the scope of the disclosure of the invention. The standard sixty minutes cassette tape 4 is a six thousand seven hundred fifty inches long. Each tape will be pre-recorded and marked to describe a particular fifty mile segment of a route, the fifty miles being arbitrary, and other distances also within the scope of the invention. Thus, in each cassette taper 4, a particular five mile segment 17 will be limited to six hundred seventy five inches of available tape 4. In order to provide the means for the user to know at what segment the tape is positioned in the cassette 3, a seven and one half inch piece of white leader 18 replaces the first seven and one half inches of the six hundred seventy five inch, five mile segment 17. The seven and one half inch leader 18 is an arbitrary length which corresponds to approximately four seconds of tape playing time. A portion of this leader 18 is used in imprint in visible letters the appropriate five mile marking 16 which corresponds to last two digits of the mileage marker on the highway. For example when the segment 17 of tape is to begin playing at mileage marker 125, the last two digits, twenty-five, would be imprinted on the leader 18 preceeding the tape segment 17. The tape 4 is to be bi-directional. By inserting the cassette in reverse position, the mileage imprints 19 are made readable from either direction by inverting a second indentical mileage imprints 19 on the leader 18. As much as the leader 18 may be used as desired for the visual imprinting. The remaining portion of the leader 18 is used for electronic control signals as desired for each set of circumstances. Between the leaders 18 for five miles segments 17, at intervals of one hundred thirty five inches, separate one mile leaders 20 are inserted. These one-mile leaders are approximately one and seven eighths inches long, corresponding to one second playing time, and have their corresponding mileage imprints 21. These leaders 18,20 are viewed by the user through the viewing window 12 in the cassette 3 and allow the user to set the tape 4 accurately to the corresponding mileage imprint markings 16. Since the tapes are to be used for distances of less than one-hundred miles, only the last two digits of the highway mileage markers need be imprinted on the leaders 18,20 to identify its proper location for playing. The exact location of the viewing window 12 on the cassette 3 and the length of tape in the cassette 3 between the audio read head 15 and the viewing window 12 will determine how far in advance of the pre-recorded information corresponding to a highway mileage marker, the appropriate leader mileage imprint marker 16 must be. When the player-controller 1 determines that a pause is required in order to allow the vehicle to arrive at a mileage for the next passage of recording, the tape 4 will be stopped so that the proper mileage marking 16 shows in the viewing window 12, and the tape 4 will remain stopped for a period of time determined by the player-controller 1. After the determined pause time, the player-controller 1 will again start playing the tape 4 and the proper passage will be heard. In addition, the magnetic tape 4 will also have an encoded signal denoting the proper highway mileage marker, which when read by the control head 14, provides an electrical signal to be supplied to the player-controller 1. Additional special signals to the player-controller 1 may be recorded on the tape 4. Such signals may in special circumstances direct the player-controller 1 to ignore pause signals. Audible instructions to the vehicle driver will also be appropriately pre-recorded on the tape 4 such as "Please turn off the player-controller until reaching mileage marker two hundred twenty."

Figure 5:
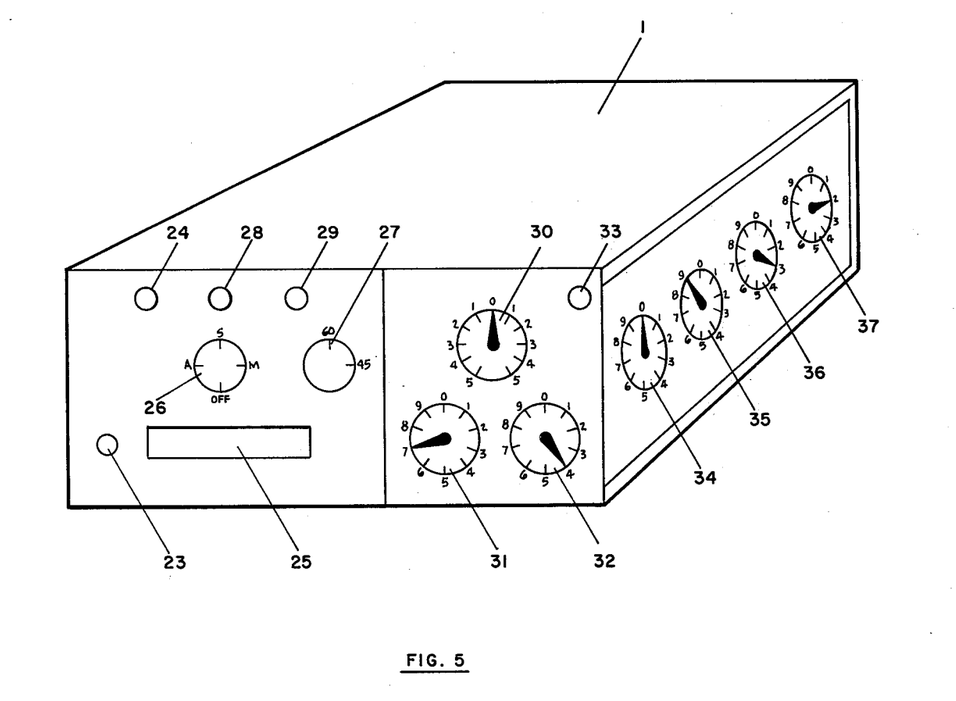
FIG. 5 is an isometric view of the player-controller.

The player-controller 1 external configuration is shown in FIG. 5 to have an on-volume switch 23, a processor on-off button switch 24, a cartridge insertion receptacle 25, a mode selector switch 26, tape selector dial 27, a set mode push button switch 28, a skip tape indicator light 29, distance adjustment dial 30, a ten mile position dial 31, a one mile position dial 32, a set mileage push button switch 33 and first, second, third, and fourth distance calibration dials 34, 35, 36, 37 respectively. Internally, the player-controller 1 is divided into two functionally separate parts, namely a player 38, and a processor 39. The player 38 is a standard tape player of known construction, except it is modified to have a control read head 14. The processor 39 has the primary function of providing resolution of time of play for the recording and the distance traveled by the vehicle, and controlling the player 39 to properly utilize the resolution. Upon installation, or when ever conditions change such as installation of new tires on the vehicle, the distance calibration dials 34, 35, 36, 37 are set. The function of the distance calibration dials 34, 35, 36, 37 is to make allowances for different odometers 5 and different tire diameters. The information for determining the proper settings for the calibration dials 34, 35, 36, 37, is available from manufacturers of vehicles and tires. The four calibration dials 34, 35, 36, 37, are used to set in the number of revolutions of the speedometer cable which correspond to the vehicle's travel of one-one-hundreth of a mile. In order to simplify the electronics of the processor 39, it is desired to use only one arithmetic function either addition, or subtraction; no division or multiplication. In this preferred embodiment, addition only is arbitrarily chosen. To meet this simplification requirement, it is necessary to set the four dials as illustrated in the following example. Assuming that it requires eight and sixty eight hundreths revolutions of the odometer drive cable 6 to indicate a vehicle travel distance of one hundreth of a mile, the user sets the first two of the four distance calibration dials 34, 35 to the next largest whole number of revolutions required of the odometer cable to indicate vehicle travel of one-one-hundreth of a mile, in this example the first dial 34 is set at zero and the second dial 35 is set on nine. Then the third and fourth dials 36, 37 the fraction of a revolution in hundreths is set, by which the next larger whole revolution exceeds the actual revolutions per hundreth of a mile; in this example the third dial 36 would be set at three and fourth dial 37 at two. The entire setting in this example for the calibration dials 34, 35, 36, 37 in their respective order would be zero, nine, three, and two.

Still referring to FIG. 5 the invention is now ready for use, and the user selects a cassette 3 for the desired segment of the route to be traveled and properly inserts it into the tape receptacle 25, and turns on the on-volume switch 23. Turning on the on-volume switch 23 automatically turns the processor 39 off. The processor consists of a controller 40, a central processing unit 41, a distance means 42, a time means 43 with a clock 44, an adder 45, a first accumulator 46, a second accumulator 47, a comparator 48, a memory module 49, and ten flip-flop switches designated, 50, 51, 52, 53, 54, 55, 56, 57, 58, 59, as shown in FIG. 6.

When the on-volume switch 23 is turned on, power is supplied to the processor through a line 60, but nothing happens since the processor on-off button 24 is off, as is the set mileage button 33. The user then selects his mode of operation of the mode selector 26 either manual, semi-automatic, or automatic; and on the tape selector dial 27, the user selects the type tape being used either forty-five minutes, sixty minutes or other length of tape being used. If the user desires to begin in the automatic mode at a point different than the beginning of the tape; the user reads the highway mileage markers last two digits only, on his route of travel, and sets on the ten mile adjustment dial 31 the corresponding number of tens of miles just observed. On the one-mile adjustment dial 2 is set the number one miles observed on the highway markers, and presses the set mileage button 33. For example if the user has just passed highway marker indicating mileage one hundred thirty six. On the ten mile adjustment dial 31, the user sets the dial to a three, on the one mile adjustment dial 32, the user sets a six and finally the user presses the set mileage button 33. If the user starts the tape at the desired starting point on the route, he need not set the mileage adjustment dials 31, 32; instead, he merely depresses the processor-on button 24. Depressing the set mileage button 33 starts the processor and the control mileage information on the tape 4 will be read and compared to the correct starting position as set in on the mileage adjustment dials 31, 32 corrected automatically for distance traveled, if any, while the tape 4 is being positioned, and the tape 4, in the fast forward winding will be properly positioned to the pre-set mileage as corrected by the processor 39. Pressing the processor-on button 24 tells the processor 39 that tape 4 is to be started at the beginning. With either of the above procedures, the tape 4 begins playing. The user may, if errors are present during the trip, discover a discrepancy between the odometer 5 and the posted mileage markers along the highway being traveled. If this occurs the user makes a change with the distance adjustment dial 30, by setting the distance adjusting dial 30 to the mileage increment which when added to the odometer 5 mileage will equal the unit distance. Although the unit distance can be any length, in this description it is arbitrarily chosen to be fifty miles. Thus, if the odometer 5 reads that forty-eight miles have been traversed when the mileage markers indicate the unit distance of fifty-miles have been traversed, the distance adjustment dial 30 is set to two. If the odometer 5 reads fifty-three miles while the mileage markers indicate only fifty miles have been traversed the distance adjustment dial 30 is set at minus three. The user can make the adjustment at distances of less than unit distance by applying a multiplication factor. For instance if the odometer 5 reads twenty four miles traversed when mileage markers indicate twenty-five miles, the increment is one mile, and must be multiplied by two to set the distance adjustment dial 30 for a fifty mile correction.

FIG. 6 is a functional diagram of the processor 39. The elements of the processor 39 are the controller 40, which controls the on-off status of the player 38 and other control functions including the reading of control information, if in automatic mode, from the tape 4; receiving the distance means 42 which keeps track of the distance traveled from the time that the processor is initialized; the processor on-off button 24; the time means 43 which keeps track of the time during which the tape plays and the Central Processing Unit, CPU, 41, which performs or causes to be performed the arithmetic or memory functions. The four basic functions are add, compare, store, and clear. An adder 45 takes the contents of an accumulator 46 and adds it, serially decimally to the contents of the accumulator 46; a comparator 48 compares the contents of accumulator 46 to the contents of accumulator 47, and if they are equal then both flip flop 50 and 51 to a zero, or if accumulator 46 is greater than accumulator 47 it sets flip flop 50 to a one and flip flop 51 to a zero; or if accumulator 47 is greater accumulator 46, both flip flop 50 and 51 are set to a one. The memory module 49 contains READ ONLY MEMORY, ROM, 61 in which constant are stored and RANDOM ACCESS MEMORY, RAM, 62 in which variables, counts, and sums are stored.

Logic-wise, when the on-volume switch 23 is turned on, power is supplied to the controller 40, on line 60 but nothing happens until either the processor on-off button 24 or the set mileage button 33 is pressed; that is, turning the player controller 1, on having been previously off, sets the other conditions to an off status. If the set mileage button 33 is depressed first, then a signal occur on line 63 which causes flip flop 53 to be tested which indicated the processor 3 on-off status; that is whether or not the processor on-off button 24 has been pressed previously or whether or not it has been turned on automatically. If the flip flop 34 is off then the controller will clear, that is store zero's in the RAM memory 62, which has designated locations 64, 65, 66, 67, 68, 69, 70, 71, 72, 73, 74, 75, 76, 77, 78, and 79 and set flip flop 52, 53, 54, 55, 56, 57, 58, and 59 to an off or zero state. If the flip flop 53 is on, set at one, then the controller will leave the RAM memory 62 and flip flops, 52, 53, 54, 55, 56, 57, and 58 as they are.

Next the controller will read the desired position from the two mileage adjustment dials 31 and 32 via lines 80 and 81 and store and resultant two digit number in RAM memory location 64 and also read the distance calibration dials 34, 35, from lines 82 and 83 respectively and store the resultant two number into RAM location 65 which will be the whole number to the next highest number, of revolutions of the odometer cable 6 required for one-one-hundreths of a mile; and set into RAM location 66 the excess fraction of a revolution, represented as though a whole number as, read through line 84 and 85 from distance calibration dials 36, and 37. Then the controller will initialize the distance means 42 through line 101 which will result in supplying which will result in supplying power to the reader 2 on line 86 and pulses will occur to the distance. means 42 on line 87 whenever the odometer cable 6 turns a complete revolution. Also the distance adjustment dial 30 is read by the controller 40 on line 88 in such a way that flip flop 52 is set to a zero if the setting is positive and to one if the setting is negative and also each position is read including the half mile positions on the dial corresponding to highway mileage markers. Thus for example, if the odometer 5 read forty seven and one half miles had passed while the highway mileage markers said fifty miles had passed, the reader 2 would have sent to the distance means 42 only ninety five pulses instead of one hundred each mile or each pulse would represent only ninety five hundreths percent of a mile instead of one percent of a mile.

Then assuming that the processor on-off 24 was currently off, and flip flop 53 a zero, the controller 40 would read the tape 6, unamplified, for control information. The control information encoded on the tape 6 will consist of a time segment, a distance segment, two digits of the beginning mileage post markers, and fast forward time in seconds. The controller 40 would store the time-segment in RAM location 69; the distance segment, in RAM location 70; the beginning mileage marker numbers, in RAM location 71 and the fast forward time in seconds into RAM location 72 for the used one mile segment within that total segment of tape 17. Then the contents of RAM location 71 would be compared to the contents of RAM location 64, and if equal, the processor on-off 24 flip flop 53, would be set to a one and the player 38 would be turned on. If the contents of RAM location 64 was less than the contents of RAM location 71 then the tape 4 would be rewound and the process repeated after setting flip flop 54 to a one; then if another rewind was to be indicated, then the tape 6 would be ejected and power would be supplied on line 89 lighting a skip tape light 29 which would indicate that the wrong cassette 3 was in the receptable 25 and to put in the next cassette 3. If RAM location 71 is less than the contents of RAM location 64, then the tape 6 would be advanced, one mile at a time, in fast forward then compared at each mile after having incremented RAM location 71 by a one until RAM location 71 was equal to RAM location 64 or until the number of miles indicated by RAM location 71 was equal to RAM location 70 was reached, in which case new control information would be read into RAM locations 69, 70, 71 and 72, and the process repeated until RAM location 71 was equal to RAM location 64. While this process is occuring, RAM location 64 will be updated by the distance means 42 so that it is current. The memory module 49 has in addition to RAM memory 62, a read only memory, ROM 61 consisting of eight locations designated ROM locations 90, 91, 92, 93, 94, 95, 96 and 97 in which constants are stored. The constants for each ROM location are respectively; 0001 in location 90; 0000 in location 91; 0054 in location 92; 0072 in location 93; 0100 in location 94, 1000 in location 95; 0075 in location 96; and 0001, or other appropriate integer, in location 97.

During fast forward movement of the tape 6 the contents of ROM location 90 would be added to the contents of RAM location 73 for each fast forward step of one mile and the result, RAM location 73 incremented by a one, stored back into RAM location 73. After new control information was read into RAM location 69, RAM location 70 RAM location 71 and RAM location 72, then RAM location 73 would be reset to a zero. A comparison of RAM location 73 to RAM location 70 would indicate, if equal, that new control information was required.

When the tape 6 is correctly positioned RAM location 64 is equal to RAM 71, and the processor 39 would be turned on automatically with the variables being left as is. If the processor on-off button 24 was pressed instead of the set mileage button 33, then the RAM location and flip flops would be cleared as before. In either case, the first thing that is read, after the processor 39 is turned on, either by pressing the processor on-off button 24 or automatically, is through line 98 the mode selector 26. If it is off, then nothing occurs, that is the player 38 is not turned on. If, however, the mode selector 26 switch is in any of the other three positions manual, semi-automatic, or automatic, the player 38 is turned on throught line 99.

If the mode selector 26 is in the manual position then the player 38 is turned on as before, and flip flop 55 is set to a one and the tape 6 will play until the user again presses either the set mileage button 33 or the processor on-off button 24. All of the control functions will be performed by the user, until a different mode is selected. That is the user will turn the processor 39 on and off, as a result of the audio prompts on the tape 6 and visual aids on the leaders 18 and 20, and templates on the outside of cassette 3.

If the mode selector 26 was in the semi-automatic mode then flip flop 56 will be set to a one and the tape selector dial 27 will be read on line 100. If the selector switch was at sixty, then the contents of RAM location 69 would be replaced by the contents of ROM location 93, that is RAM 69 would be set at seventy two whereas, if the switch was at the forty-five position, then RAM fifty-four. In either case, the contents of RAM location 70, would be set to location 69 would be set to the contents of ROM location 92, or fifty-four. In either case, the contents of RAM location 70, would be set to the contents of ROM location 97, arbitrarily a one.

If the mode selector switch 26 was at the automatic position, then flip flop 53 would be tested and if it was already a one, the unit was already turned on automatically by the set mileage button 3 being pressed, however, if flop flop 53 was a zero, that is the processor on-off button 24 was pressed then the variables, RAM's, and flip flops 52, 53, 54, 55, 56, 57, 58 and 59 would be set to zero and the tape 6 would be read until control information was sensed and the information would be read into RAM locations 69, 70, 71, 72, and 73, as before and flip flop 53 would be set to a one.

In case of either semi-automatic or automatic mode at the conclusion of the processor on-off button 24 pressing sequence, then if flip flop 53 was previously a zero, the distance adjustment dial 30 and distance calibration dials 34, 35, 36, 37 will be read as RAM location 65, 66, 67, and 68 will be set accordingly, and RAM location 64 will be set to RAM location 71. Thus, at that time, RAM location 64 will contain the current position as to the odometer or as supplemented by an external reference, that is through the set mileage button 33 on process or by being set to the contents of RAM location 71 or being at zero if in the semi-automatic mode; RAM location 65 will be the whole number of odometer cable 6 revolutions, to the next highest if not an exact whole number, required for a hundredth of a mile; RAM location 66 will be the fractional excess of RAM location 65 over the number required to the nearest hundredth of a revolution, expressed however, as a whole number, for example thirty-two hundredths would be thirty two; RAM location 67 is twice the total number of pulses from the reader 2, each pulse representing a hundredth of a mile, counted during each half mile, or twice the actual count. Then if flip flop 52 is a zero, the contents of RAM location 68 is replaced by RAM location 67 and RAM location 67 is then replaced by ROM location 94 and the result stored back into RAM location 67 and flip flop 52 is cleared to a zero. This has the effect of either having the base count of the number of a hundredth of a mile needed per mile to be set to some number greater than one and still counting only to one hundred if the odometer 5 is reading less than the mileage indicated by the highway mileage markers; or, setting the number of pulses required to a number in excess of one hundred leaving the base count a zero if the odometer 5 is indicating one mile, for example one hundred or greater if the odometer 5 is reading greater than it should; RAM location 68 is the base count of the number of a hundredth of a mile to be used for 1 mile; for example zero or greater if the odometer 5 is reading less than it should; RAM location 69 is a time segment for a corresponding one mile segment 20 in seconds; RAM location 70 is the number of distance segments 20 of one mile each that are to be played continuously; RAM location 71 is the beginning milepost number of the segment 17 to be played, a zero if semi-automatic, or as indicated if automatic or throught set mileage button 33 process; RAM location 72 is the number of seconds of fast forward required to pass over a one mile segment 20, of any number of seconds, of tape 6; RAM location 73 is the current number of one mile distance segments 20 that have been played or passed normally a zero, unless the set mileage button 33 being pressed set it otherwise. Now the distance means 42 and time means 43 will come into play. The distance means 42 receives pulses on line 87 as the odometer cable 6 turns each revolution. As each pulse is received, the contents of RAM location 74 is incremented by one and the result is compared to the contents of RAM location 65 and when equal the contents of RAM location 75 is incremented by one and the contents of RAM location 76 is added to the contents of RAM location 66 and stored back into RAM location 76. Also RAM location 74 is set to a zero; then the contents of RAM location 76 is compared to the contents of ROM location 94, one hundred, and if equal or greater, than the two most significant digits of RAM location 76 are set to a zero and RAM location 74 is incremented on one. Then the contents of ROM location 94, one hundred, and of RAM location 75 are compared, and if equal, RAM location 64 and RAM location 73 are incremented by one and a pulse is generated on line 105 to the controller 40 indicating that one mile has been traversed.

The time means 43 receives an initialization pulse on line 102 from the controller 40. It has an internal clock 103 which is arbitrarily a millisecond clock. When an initialization pulse occurs on line 102 then RAM location 77 is set to a zero and the clock 103 starts. Each time that ten milliseconds occur on the clock 103 the contents of RAM location 77 is incremented by one and the result is compared to ROM location 94 and if equal, RAM location 77 is set to a zero and a pulse is generated on line 104 to the controller 40, indicating a lapsed time of one second.

Thus, the controller 40 receives a pulse ever second from the time means 43 and a pulse every mile from the distance means 42. When a pulse is sensed on line 104 from the time means 43 then flip flop 58 is tested and if a zero then the contents of RAM location 78 in incremented by one and compared to the contents of RAM location 69 and if equal then RAM location 78 is set to zero and RAM location 79 is incremented by one. If flip flop 58 was a one, RAM location 78 would not be incremented. When a pulse occurs on line 105 the controller 40 tests flip flop 57. If flip flop 57 is off, RAM location 73 is incremented by one. When RAM location 79 is incremented by one, as before, a test sequence occurs which controls the player 38.

First, the controller 40 compares the contents of ROM location 96 to the contents of RAM location 75 and if RAM location 75 is equal to or greater than ROM location 96, the threshold which is used to eliminate short pauses, it then sets flip flop 57 to a one and increments RAM location 73 and RAM location 64 by a one. Then the contents of RAM location 79 are compared to the contents of RAM location 70 and if equal the contents of RAM location 79 are compared to the contents of RAM location 73 and if RAM location 73 is equal to or greater than RAM location 79 then the player 38 is left on. However, if RAM location 73 is less than RAM location 79, then flip flop 58 is set to a one which inhibits the incrementation of RAM location 78 and by implication RAM location 79; of course, RAM location 73 will continue to be incremented as will RAM location 75 and when a pulse occurs on line 104 from the time means 43, RAM location 73 and 79 well be tested again until they become equal. In the mean-time the player 38 will be turned off until RAM location 73 and 79 are equal at which time the player 38 will be turned back on. If the contents of RAM location 73 is equal to or greater than RAM location 79 then the player will be left on and if flip flop 56 is on, indicating semi-automatic mode, the contents of both RAM location 73 and 79 will be left as is, and the contents of ROM location 97 will be added to the contents of RAM location 70 and the result stored back into RAM location 70. RAM location 73 and 79 will be compared to the contents of ROM location 94, and if either are equal, the appropriate RAM location 73 and 79 will be set to zero and flip flop 59 will be set to a one. If flip flop 59 is a one and the contents of RAM location 79 is equal to the contents of RAM location 73 then the skip tape light 29 will be lit. If, however, flip flop 56 was not on, thus indicating the automatic mode, then both RAM location 73 and RAM location 79 will be set to zero. Also when RAM location 73 becomes equal to RAM location 79, if it had been less before, then flip flop 58 will be reset to zero allowing the time pulse counters RAM location 78 and RAM location 79 to be encremented as the tape 6 plays. It is obvious that there could be many other specific designs electronically for the processor 39 which would function nearly identically to the design described in the preferred embodiment. The most practical means would utilize a new or existing micro processor chip, which may even include the capacity to perform other functions in the vehicle.

Having thus discussed the automatic mode of operation of the invention, the semi-automatic and manual modes need to be further described.

When the mode selector switch 26 is placed in the semi-automatic mode, the reading of control information is eliminated from the system. The correlation of tape position and vehicle position is dependent mainly on the constants in ROM location 92, 93, and 97. In the semi-automatic mode, the invention still utilizes the external reference system of highway mileage markers, and uniform distances traveled for each cassette 3. There will, however, be no automatic adjustment and elimination of pauses, and the user will have to place heavy reliance on the external reference system. distances traveled for each cassette 3. There will, however, be no Since the controller 40 in this mode acts as a power source for the player 38, it would be practical to construct the controller 40 unit for the semi-automatic mode as a separate unit to be used with an already installed player 38.

In the manual mode, the invention provides no control features, and all control is in the descretion of the user. The tapes 4 and cassettes 3 would contain the same audio prompts and visual references to the user. The use of the same external reference system, highway mileage markers would permit the user to place a standard tape recorder in fast forward or off in order to adjust the position of the tapes to correspond to the vehicle's position.

I claim:

1. A method for correlating the playing of recorded audio informative passages in a vehicle with the actual location of said vehicle comprising the steps of:

selecting, with respect to a standard external reference system, an initial reference point on a determined route;

Recording the informative audio passages with frequent pause points on both sides of a suitable magnetic recording medium of fixed length with respect to distance of travel so that the medium can be played in either direction corresponding to the direction of travel of the vehicle;

recording on the medium, using the standard external reference system, visible indicies, audio prompts, and electronically readable indicies;

obtaining a distance traveled signal from distance measuring equipment in the vehicle to indicate the distance traveled from the initial reference point;

correcting the distance traveled signal for the particular tire wheel and distance measuring equipment characteristics of said vehicle;

obtaining a proper recorded medium location signal by means of a player;

comparing the corrected distance traveled signal with the proper location signal to generate a first control signal;

applying the control signal to said player to stop the player or fast wind the medium so that play of the medium will commence at the proper vehicle location along said route, generating a time of play signal of said medium from a clock;

comparing the time of play signal with the corrected distance traveled signal, to obtain a signal which is applied to the player to continuously regulate the duration and extent of pauses in playing the medium;

selecting a current observed external reference point from said external reference system and generating a current location signal to correspond to said external point;

comparing the time of play signal to the current location signal and generating a second control signal;

applying the second control signal to the player to stop the player or fast wind the medium so that the play of the medium will commence again at a location thereon which generally corresponds to said observed external point; and obtaining a distance adjustment signal from the player as set by the vehicle driver to adjust for random observed errors by applying the distance adjustment signal to the corrected distance traveled signal.

2. A system for playing informative audio passages recorded on a suitable magnetic recording medium in a vehicle equipped with a power source and distance measuring equipment for obtaining distance traveled and for controlling the playing of the recorded passages so as to be synchronized with the actual location of the vehicle along a determined route, said system comprising:

a means for obtaining distance traveled data from the distance measuring equipment and converting said data to a distance traveled signal, said distance traveled being measured from an initial starting point within a standard external reference system on said route;

a means for correcting the distance traveled signal for the particular distance measuring equipment, tires and wheel characteristics of said vehicle;

pre-recorded audio informative passages with frequent pause points on both sides of a suitable magnetic recording medium of fixed length with respect to distance of travel so that the medium can be played in either direction corresponding to the direction of travel of the vehicle;

proper location signals recorded on said medium in binary code digital language, visible location digital language, visible location indicies, electronically readable indicies, and audio prompts, all of which are pre-recorded with respect to said standard external reference system;

a player-controller for playing the recording medium and for independently reading the recorded passages and the coded proper location signal, having a two speed winding capability, and having means for comparing the corrected distance traveled signal with the proper location signal to generate a first control signal which the player-controller applies to the player to stop the player or fast wind the medium, so that play of the medium will commence at the proper vehicle location along said route, and the player-controller having means for generating a time of play signal of said medium from a clock, and the player-controller having means for comparing the time of play signal with the corrected distance traveled signal in order to obtain another signal which is applied to the player to continuously regulate the duration and extent of pauses in playing the medium, and the player-controller having means for accepting a current vehicle location setting which corresponds to an external reference point actually observed with respect to said standard external reference system, for generating a current location signal corresponding thereto, for comparing said current location signal to the time of play signal and for generating a second control signal which is applied to stop the player or fast wind the medium, allowing the vehicle location and position of the medium to generally correspond, and the player-controller having means for adjusting the corrected vehicle distance traveled signal for errors in said distance traveled measuring equipment which may result in a discrepancy between actual observed and instrument indicated distance traveled, caused by variations in temperature, tire pressure, road conditions, and random errors.

3. The system of claim 2 wherein the means for obtaining vehicle distance traveled data and converting said data to a distance traveled signal comprises:

a reader connected between an odometer and an odometer drive cable, the reader having a wafer ring connected to the odometer cable at one end of the odometer, said wafer ring being of electrically conductive material except for a small non-conductive section thereof, said reader having two wipers which slidably contact the wafer ring, so that when electrical power is applied to the two wipers and when both wipers are in contact with the conductive portion of the wafer ring, electrical current flows, while when either or both wipers are in contact with the non-conducting portion of the wafer ring, no current flows; and a flip flop switch which is set by current and reset by a lack of current and which receives interrupted current generated by the reader, the flip flop switch generating a pulse for each revolution of the wafer ring which is then sent to the player-controller.

4. The system of claim 2 wherein the means for correcting the vehicle distance traveled signal for the particular distance measuring equipment, tire and wheel characteristics of said vehicle comprises:

a series of four calibration dials on which are set the ratio of the number of odometer turns per mile of distance traveled by the vehicle wherein the first two dials are digitally set to the next largest number of complete revolutions which exceeds the actual number of revolutions of said odometer cable, the third and fourth dials are digitally set to the decimal fraction, to the nearest hundredth of a revolution, by which the next largest number of whole revolutions, exceeds the actual number of revolutions, and wherein said dials are connected to the player-controller in such a manner that the player-controller reads the ratio.

5. The system of claim 2 wherein the means for setting an initial reference point and for setting a current observed reference point using the standard external reference system comprises:

a ten-mile position adjustment dial and a one mile position adjustment dial, and wherein the external reference system is the federal highway mileage marker system, wherein the ten-mile position adjustment dial is set to correspond to a passed mileage marker to denote tens of miles, the one-mile position adjustment dial is set to correspond to the passed mileage marker to denote the miles less than ten and the distance adjustment dials are electronically connected to the player-controller in a manner that the player-controller reads the settings.

6. The system of claim 2 wherein the means for adjusting the corrected distance traveled signal for errors in said distance measuring equipment comprises:

a distance adjustment dial on which a user sets the number of miles, to the nearest half mile, said number being either positive or negative, which must be added to the odometer indication of distance traveled when the vehicle has traveled fifty miles as indicated by the external reference system.

7. The system of claim 2 wherein the suitable recording medium comprises:

magnetic tape having segments of leader uniformly spaced on intervals of tape to be played which each correspond to one mile of distance traveled, the segments of leader having magnetically recorded thereon two digits corresponding to the location at which the tape should be playing as defined by the standard external reference system, said segments of leader also having imprinted thereon visible indicies corresponding to the same location.

* * * * *